US005513261A

United States Patent [19]
Maher

[11] Patent Number: 5,513,261
[45] Date of Patent: Apr. 30, 1996

[54] KEY MANAGEMENT SCHEME FOR USE WITH ELECTRONIC CARDS

[75] Inventor: David P. Maher, Windham, N.H.

[73] Assignee: AT&T Corp., Murray Hill, N.J.

[21] Appl. No.: 175,027

[22] Filed: Dec. 29, 1993

[51] Int. Cl.⁶ .................... H04L 9/32; G07F 7/10
[52] U.S. Cl. ................ 380/23; 380/24; 380/25; 235/380
[58] Field of Search .............. 380/23–25; 235/380

[56] References Cited

U.S. PATENT DOCUMENTS

| | | | |
|---|---|---|---|
| 4,672,182 | 6/1987 | Hirokawa | 235/380 |
| 4,763,419 | 4/1988 | Roe | 380/23 X |
| 4,969,188 | 11/1990 | Schöbi | 380/23 |

*Primary Examiner*—Gilberto Barrón, Jr.

[57] ABSTRACT

In an electronic card of the type for insertion into a host electronic device for providing to the host device security parameters pertaining to the rightful holder of the card, the security parameters are stored in encrypted form to preclude their discovery by unauthorized parties. The decryption mechanism resists probing by unauthorized parties.

6 Claims, 2 Drawing Sheets

KEY MANAGEMENT SCHEME FOR USE WITH ELECTRONIC CARDS

BACKGROUND OF THE INVENTION

1. Field of the Invention

This invention relates to "Smart Cards" and Personal Computer Memory Card Interface Association cards and the like for insertion into personal computers, communication devices, point-of-sale terminals and the like, and particularly to means for securing such cards to preclude unauthorized use.

2. Description of the Related Art

Well known in the prior art are small, usually thin, usually pocketable devices commonly known as "cards" into which information that may be used to identify a particular user is electronically stored. Such cards are intended to be inserted into host devices such as personal computers, communication devices and the like which, in concert with such cards, may provide services only to certain users as identified by the aforesaid user information stored in such cards.

An organization known as the Personal Computer Memory Card Interface Association (PCMCIA) specifies the interface standards for such cards. Cards which meet most of the PCMCIA interface standards are hereinafter referred to as "PCMCIA security cards" or "PCS cards". In addition, there are other "credit card" sized devices known as smart cards. The ISO specifies the interface standards for those cards.

A user might have a card into which is coded a representation of her identity, her signature, passwords or keys that identify her or are reserved for her use, etc. Such parameters are hereinafter referred to as "security parameters". The user might insert her card into a host device such as a computer or communications terminal, said host device might then read such information from the card, and might then grant her access to data intended only for her, allow her to enter messages that recipients will believe to be only from her, enter a digital signature that will be interpreted as hers, etc.

PCS cards, being small, are easily lost, stolen, or left unguarded permitting temporary unauthorized use or duplication. If an unauthorized party inserts the card or a copy of the card into a host device, the host device will read the security parameters from the card just as if the authorized holder of the card had inserted it. Such unauthorized party will thus gain access to services and privileges intended only for the authorized holder of the card; system security may thus be severely compromised.

In order to forestall such unauthorized use, it is common to associate with each individual card a parameter known as a Personal Identification Number, or PIN, known only by authorized parties (usually the card's intended user and the issuer of the card). Commonly, when the card is used, the user is prompted by the host device for the user's PIN. A method is used which compares the number entered by the user to the PIN associated with the card. If the method does not produce a positive result, then the user is denied access to the services normally provided by use of the card.

In the prior art, as exemplified by cards used with automatic teller machines, the user is assumed to not have access to the mechanism in the host device or network which verifies the PIN. However, there are many new applications of cards for which that assumption is inappropriate. For example, a card may be used to provide a digital signature on a document that is produced on a personal computer that is owned by and could be modified or even designed by the user of the card. If an intruder should gain access to the card, the intruder could copy its contents, return the card surreptitiously to the rightful owner, and then use specialized "PIN cracking" algorithms on the card copy using his own computer in order to discover the PIN that unlocks the signature mechanism. From then on, the intruder can use the copy. Since the intruder has control of the host, it is possible for the intruder to program the host to try millions of different PINs per second. In most cases the PIN will be discovered in a few seconds. If we assume that the intruder has access to the internals of the card copy, the intruder can disable any self-destruction mechanism the card may employ.

In some cases, a user may even be motivated by financial considerations to divulge his own PIN. There are situations where the user of an authorized card or a host device will be motivated to make unauthorized copies of the card or host device in order to defraud the provider of a service. Consider the case where a card is inserted into a home cable converter box in order to gain access to premium services. The user may purchase an authorized converter box and card, and then produce copies of the card and the box for sale to others who are not specifically authorized by the provider of the service.

SUMMARY OF THE INVENTION

The method of the present invention precludes use of the card or a copy of the card by a wrongful or unauthorized holder by storing the security parameters in an encrypted file in the PCS card in a carefully controlled manner. The key to that file (known as the key file encryption key or KFEK) is not stored on the card; instead it is generated from a personal identification number (PIN) entered by the user (and presumably known only to the authorized user). The PIN is entered on an input facility (typically a keyboard of the host device); in order to be easily remembered by the authorized user, it typically takes the form of a sequence of six to eight ASCII characters. In a process controlled within the PCS card the PIN is converted to a (typically) 80 bit crypotovariable component, which in turn is combined with a card-unique, secret component in the PCS memory to regenerate the KFEK, permitting retrieval of the security parameters.

The KFEK and any retrieved security parameters are stored in volatile memory on the PCS card and are thus cleared when the PCS card is removed, or by other mechanisms employed on the card. The KFEK is only generated when needed. Additionally, the security parameters in volatile memory may be cleared upon command from the host device.

The integrated circuitry of the card employs known technology that resists probing or reverse engineering. The secret parameter that is used, along with the PIN, to produce the KFEK is stored in non-volatile, read-only memory, that can be read only internal to the IC on which the secret parameter is stored. Thus, the card cannot be copied without access to the internals of the IC. The IC is designed, using known technology, in such a way as to prevent probing by an intruder for the purpose of discovering the secret parameter. Included in the IC is a delay that imposes a waiting period between PIN trials, which curtails the use of PIN cracking algorithms.

Under the present invention, unauthorized or counterfeit cards will not be useful, and the PIN cannot be discovered by an unauthorized party using either the card or a copy of the card in an intruder rig specifically designed to speed up the process of discovering the PIN.

The novel features of construction and operation of the invention will be more clearly apparent during the course of the following description, reference being had to the accompanying drawings wherein has been illustrated a preferred form of the invention.

DESCRIPTION OF THE PREFERRED EMBODIMENTS

Figure 1:
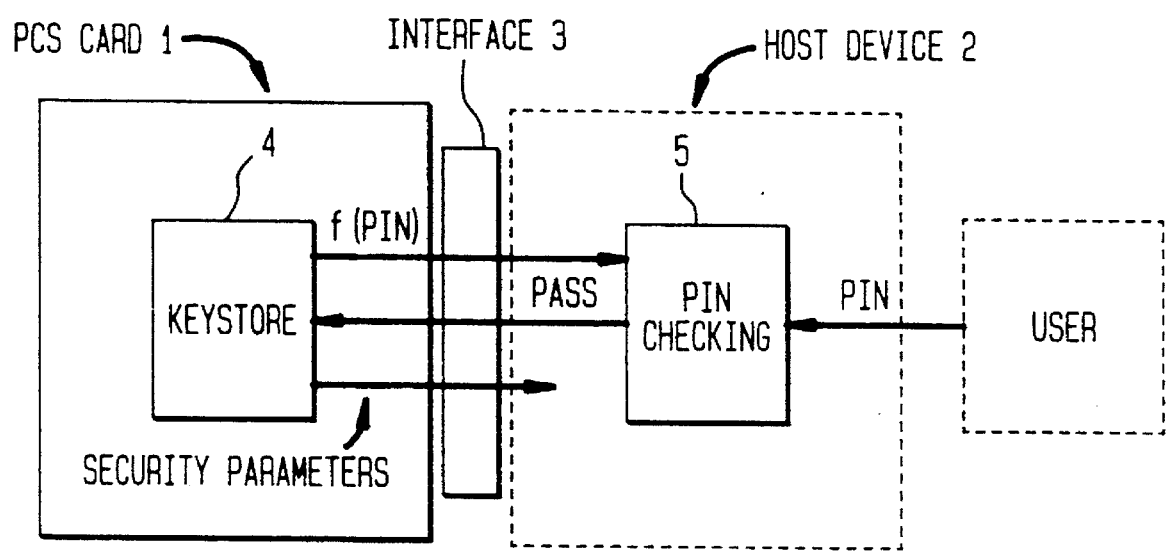
FIG. 1 depicts a PCS-card-based keystore scheme of the prior art.

FIG. 1 depicts a keystore scheme of the prior art. A PCS card 1 is connected to a host device 2 through an interface 3. Interface 3 is electrically and mechanically consistent regarding both PCS card 1 and host device 2, and is typically the well-known PCMCIA interface or an ISO smart card or similar interface.

Security parameters such as passwords, signatures, and communication keys are stored in keystore 4 and are thus accessible to host device 2. It is presumed in the prior art that PCS card 1 is in the possession of and was inserted by, its rightful holder; insertion of PCS card 1 thus enables any holder of it, even one who has wrongfully appropriated or duplicated it, to be recognized by host device 2 as the rightful holder and to perform any actions and receive any services that the rightful holder may perform or receive. It is also presumed in the prior art that in order for the host to access the security parameters, the user must first enter a PIN which is checked for its validity on the host or within the card itself FIG. 1 depicts the PIN checking being performed in host device 2 by PIN Checking circuit 5. In the prior art, the PIN is normally transformed by a mathematical function and the transformed value is compared against a value that is stored in the card. If there is a match, signaled by the Pass signal from PIN checking circuit 5, then the card provides security parameters to the host, or the card is enabled to perform security functions for the user. It is presumed in the prior art that the user does not have access to the PIN transformation, comparison mechanism, or to other mechanisms necessary to make the card fully functional (except for the entry of the valid PIN) through the user interface.

Figure 2:
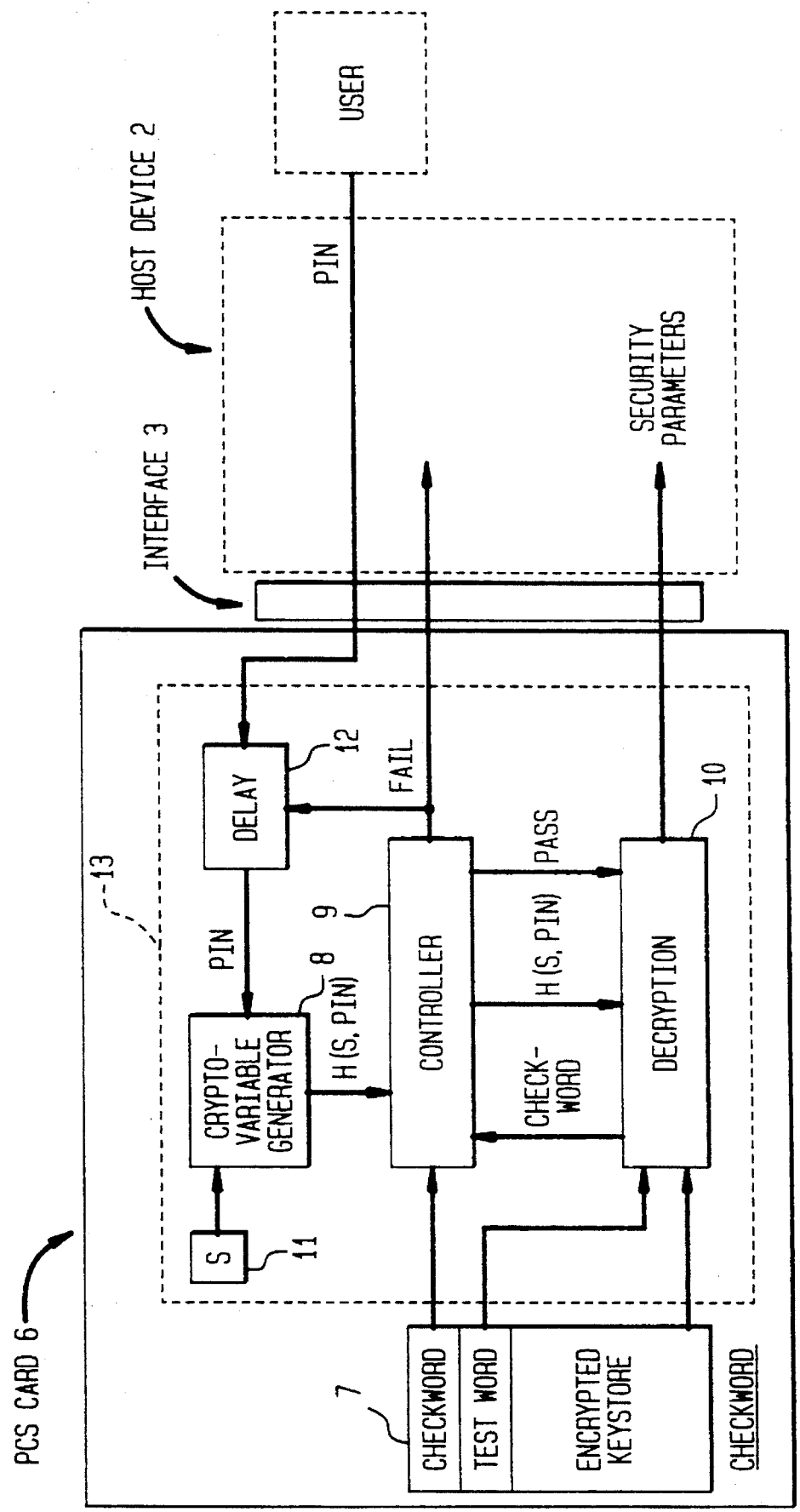
FIG. 2 depicts the keystore scheme of the present invention.

FIG. 2 is an overview of the keystore scheme of the present invention, which precludes the wrongful holder of a PCS card from being recognized as the rightful holder. PCS card 6 of the present invention is inserted in interface 3 of host device 2, both of which may be as in the prior art. The user is prompted for and enters a PIN number within host device 2 by means known to those in the art and not discussed here. The PIN is forwarded to PCS card 6 through interface 3 where it is passed through delay 12 (to be discussed further below) and input to cryptovariable generator 8.

Several of the logic components to be discussed, including cryptovariable generator 8, are on integrated circuit chip 13 Coded on chip 13 is secret parameter S 11, which is also input to cryptovariable generator 8. S 11 can be unique to each chip, or it can be identical for all or many chips; as will be discussed further below, it is better to have S 11 be unique to each chip. Cryptovariable generator 8, through means known to those in the art, computes the one-way Hash function K=H(PIN,S), which is used as the KFEK.

Controller 9 verifies that the KFEX is the correct one as follows: the test word is retrieved from memory 7 to decryption logic 10 which produces a 64 bit checkword as a function of the test word and the KFEK, which checkword is compared by controller 9 with the checkword stored in memory 7, which is the previously-computed function of the test word and the KFEK as computed with the correct PIN. If the presently entered PIN is the correct one, the computed checkword will match the stored checkword.

If the computed and stored checkwords campare, the user-entered PIN must have been the correct one; decryption function 10 of chip 13 is enabled to decrypt the encrypted security parameters stored in memory 7 according to the KFEK and pass them to host device 2.

If the two checkwords do not compare, an incorrect PIN has been entered. Controller 9 will so notify host device 2, and will also condition delay 12 to not accept another pin for two seconds. Delay 12 is also so conditioned upon applying power to PCS card 6 so that an intruder cannot defeat the delay by instantaneously interrupting power.

Upon being informed of the aforementioned checkword comparison failure, host device 2 may instruct the user to retry entering her PIN. If host device 2 is a cracking rig, it will expect to try another PIN. For a 32-bit PIN (in fact having 32 bits of entropy, i.e., not something that an intruder might be moved to try, such as rightful user's mother's maiden name), a brute-force attack will take, on average, over 100 years with this two-second delay between tries.

An intruder in possession of PCS card 6 might attempt to reverse engineer chip 13 in order to divine the nature of secret parameter S 11, cryptovariable generation 8, controller 9, and decryption 19. This risk is minimized in the preferred embodiment by fabricating chip 13 using known anti-reverse engineering technology such as anti-fuse elements, protective coatings, etc.

It was mentioned above that it is better if S 11 is unique to each chip: should an attacker succeed in determining its value for one particular chip, she will still not be able to use other PCS cards of the present invention.

One skilled in the art will appreciate that the invention may be embodied in other specific forms without departing from the spirit thereof. The invention is intended to be embraced by the appended claims and not limited by the foregoing embodiment.

What is claimed is:

1. In an electronic device issued to a particular user for insertion into a host electronic device and for providing to said host electronic device, upon entry into the host electronic device of a predetermined personal identification number (PIN), parameters identifying or associated with the particular user, means for securing the parameters against use by other then said particular user, comprising:
   means for storing the parameters in encrypted form according to a key;
   means for receiving the PIN from the host device;
   means for computing the key as a function of at least the PIN entered by the user; and
   means for decrypting the parameters according to the key.

2. The electronic device according to claim 1, wherein further:

the means for computing the key and the means for decrypting the parameters are portions of integrated circuitry of the type resistant to reverse engineering.

3. The electronic device according to claim 1 wherein further:

the means for receiving the PIN includes a delay which precludes a subsequent PIN from being accepted for a predetermined period.

4. The electronic device according to claim 3 wherein further:

the means for computing the key, the means for decrypting the parameters, and the delay are portions of integrated circuitry of the type resistant to reverse engineering.

5. The electronic device according to claim 1 further comprising:

means for storing a predetermined secret parameter;

and wherein further:

the key is computed as a function of at least the PIN entered by the user and the secret parameter.

6. The electronic device according to claim 5 wherein further:

the means for storing the secret parameter, the means for computing the key, and the means for decrypting the parameters are portions of integrated circuitry of the type resistant to reverse engineering.

* * * * *